(12) United States Patent
Kim (10) Patent No.: US 10,110,696 B2
(45) Date of Patent: *Oct. 23, 2018

(54) MODULE RELAY DEVICE AND RELAY METHOD THEREFOR

(71) Applicant: LG CHEM, LTD., Seoul (KR)

(72) Inventor: Jihoon Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 257 days.

This patent is subject to a terminal disclaimer.

(21) Appl. No.: 14/890,376

(22) PCT Filed: Oct. 31, 2014

(86) PCT No.: PCT/KR2014/010353
§ 371 (c)(1),
(2) Date: Nov. 10, 2015

(87) PCT Pub. No.: WO2015/065096
PCT Pub. Date: May 7, 2015

(65) Prior Publication Data
US 2016/0119442 A1    Apr. 28, 2016

(30) Foreign Application Priority Data

Oct. 31, 2013 (KR) .......... 10-2013-0130748

(51) Int. Cl.
*H04L 29/08* (2006.01)
*G06F 9/54* (2006.01)
(Continued)

(52) U.S. Cl.
CPC ............ *H04L 67/288* (2013.01); *B60L 11/00* (2013.01); *B60L 11/1851* (2013.01);
(Continued)

(58) Field of Classification Search
CPC ........ H04L 67/12; H04L 67/288; B60L 11/00; B60L 11/1851; B60W 10/00; G06F 9/541; Y02T 10/7005; Y02T 10/705
(Continued)

(56) References Cited

U.S. PATENT DOCUMENTS

2003/0147534 A1* 8/2003 Ablay .................. H04L 9/3271
380/270
2010/0292867 A1 11/2010 Böhm et al.
(Continued)

FOREIGN PATENT DOCUMENTS

| CN | 101946234 A | 1/2011 |
| CN | 102009599 A | 4/2011 |

(Continued)

OTHER PUBLICATIONS

Korean Office Action for Appl. No. 10-2013-0130748 dated Jan. 29, 2016 (w/ English translation).
(Continued)

*Primary Examiner* — James E Springer
(74) *Attorney, Agent, or Firm* — Birch, Stewart, Kolasch & Birch, LLP (57) ABSTRACT

Provided are a module relay device and a relay method therefor, and more particularly, a module relay device and a relay method therefor which can guarantee independency by removing execution relationships of one or more respective modules by relaying a call among one or more manager modules, one or more application modules and service modules that perform functions of the battery management system in the middle.

20 Claims, 6 Drawing Sheets

(51) Int. Cl.
  *B60L 11/00* (2006.01)
  *B60L 11/18* (2006.01)
  *B60W 10/00* (2006.01)

(52) U.S. Cl.
  CPC ............. *B60W 10/00* (2013.01); *G06F 9/541* (2013.01); *H04L 67/12* (2013.01); *Y02T 10/705* (2013.01); *Y02T 10/7005* (2013.01)

(58) Field of Classification Search
  USPC ........................................................ 709/201
  See application file for complete search history.

(56) References Cited

U.S. PATENT DOCUMENTS

| | | | |
|---|---|---|---|
| 2011/0022809 A1 | 1/2011 | Satoh et al. | |
| 2011/0078092 A1 | 3/2011 | Kim et al. | |
| 2012/0078440 A1* | 3/2012 | Oravis | B60R 1/00 701/1 |
| 2012/0157083 A1* | 6/2012 | Otterson | B60L 11/1842 455/422.1 |
| 2012/0159436 A1 | 6/2012 | Morgan et al. | |
| 2013/0015814 A1* | 1/2013 | Kelty | B60L 3/0046 320/109 |
| 2013/0166674 A1* | 6/2013 | Olsen | H04L 69/08 709/217 |
| 2014/0325218 A1* | 10/2014 | Shimizu | H04L 9/3271 713/168 |
| 2015/0043594 A1* | 2/2015 | Kim | H04L 45/42 370/422 |
| 2015/0077054 A1* | 3/2015 | Uyeki | H02J 7/0052 320/109 |
| 2016/0311338 A1* | 10/2016 | Klapper | B60L 11/1842 |
| 2017/0253127 A1* | 9/2017 | Ciaccio | B60L 1/00 |

FOREIGN PATENT DOCUMENTS

| | | |
|---|---|---|
| JP | 2011-28659 A | 2/2011 |
| JP | 2011-87112 A | 4/2011 |
| JP | 2012-128788 A | 7/2012 |
| JP | 2012-155682 A | 8/2012 |
| WO | WO 2011/037322 A3 | 1/2011 |

OTHER PUBLICATIONS

International Search Report, issued in PCT/KR2014/010353, dated Jan. 29, 2015.
Written Opinion of the International Searching Authority, issued in PCT/KR2014/010353, dated Jan. 29, 2015.
Korean Office Action for Appl. No. 10-2013-0130748 dated Jul. 29, 2016 (w/ English Translation).

\* cited by examiner

Fig. 1

PROJECT A: APPLICATION MODULE A AND APPLICATION MODULE B ARE
USED AMONG ONE OR MORE APPLICATION MODULES 12

Fig. 2

PROJECT B: APPLICATION MODULE A AND APPLICATION MODULE C ARE
USED AMONG ONE OR MORE APPLICATION MODULES 12

MODULE RELAY DEVICE AND RELAY METHOD THEREFOR

TECHNICAL FIELD

This application claims priority to and the benefit of Korean Patent Application No. 10-2013-0130748 filed in the Korean Intellectual Property Office on Oct. 31, 2013, the entire contents of which are incorporated herein by reference.

The present invention relates to a module relay device and a relay method therefor, and more particularly, to a module relay device and a relay method therefor which can guarantee independency by removing execution relationships of one or more respective modules by relaying a call among one or more manager modules, one or more application modules and service modules that perform functions of the battery management system in the middle.

BACKGROUND ART

In general, batteries used for an electric vehicle (EV), a hybrid vehicle (HV), and a home or industry, that is, secondary batteries are high in application easiness depending on a product group and have electrical characteristics such as high energy density, and the like.

The secondary batteries have attracted public attention as a new energy source for environment-friendly and improvement of energy efficiency in that no by-product is generated depending on use of energy in addition to a primary advantage of remarkably reducing use of fossil fuel.

In this case, when multiple secondary batteries alternately perform charging and discharging, the multiple secondary batteries need to be managed so that the batteries maintain an appropriate operating state and performance by efficiently controlling the charging and discharging of the secondary batteries.

To this end, a battery management system (BMS) that manages a state and a performance of the battery is provided. The BMS measures current, voltage, a temperature, and the like of the battery to estimate a state of charging (SOC) of the battery based on the measured current, voltage, temperature, and the like and controls the SOC so that fuel consumption efficiency is highest. The SOC of the battery that performs the discharging needs to be accurately measured in order to accurately control the SOC.

Meanwhile, since the battery management system in the related art cannot be standardized, execution relationships among a manager module, an application module, and a service module used in a battery management system in the related art are complicatedly mixed with each other, and as a result, calling internal functions that are present in the respective modules is performed. Therefore, a change of a specific module influences the other module, and as a result, it is impossible to reuse the modules.

Further, in an AUTomotive System Architecture (AUTOSAR) meaning an automotive standard software architecture, in the related art, an AUTOSAR Compliant standard software module cannot be simultaneously applied to application layers of an opened AUTOSAR and a non-opened AUTOSAR (NON-AUTOSAR), and as a result, there is inconvenience that the AUTOSAR Compliant standard software module should be individually developed according to the opened AUTOSAR and the non-opened AUTOSAR.

Therefore, in order to solve the problem of the battery management system that cannot be standardized in the related art, the present inventor has invented a module relay device and a relay method therefor, which can guarantee independence by removing execution relationships of one or more respective modules by relaying a call among one or more manager modules, application modules and service modules that perform functions of the battery management system in the middle.

DETAILED DESCRIPTION OF THE INVENTION

Technical Problem

The present invention is contrived to solve the above-mentioned problems and the present invention has been made in an effort to provide a module relay device and a relay method therefor, which can guarantee independency by removing execution relationships of one or more respective modules by relaying a call among one or more manager modules, one or more application modules and service modules that perform functions of battery management system in the middle.

In more detail, the present invention has been made in an effort to provide a module relay device and a relay method therefor which can receive function call request signals from one or more respective manager modules, application modules, and service modules and connect one or more manager modules, application modules, and service modules through call functions corresponding to the received function call request signals.

The present invention has also been made in an effort to provide a module relay device and a relay method therefor which can serve as a passage for calling functions of one or more respective manager modules, application modules, and service modules.

The present invention has also been made in an effort to provide a module relay device and a relay method therefor which can prevent a change in functions of one or more respective manager modules, application modules, and service modules from influencing another module.

The present invention has also been made in an effort to provide a module relay device and a relay method therefor which can have independency between an operation of an AUTOSAR standard module and a function of the module.

Technical Solution

An exemplary embodiment of the present invention provides a module relay device including: a request signal receiving unit receiving one or more function call request signals from one or more manager modules and one or more application modules included in an application layer and one or more service modules included in basic software (BSW); and a relay unit selecting the modules corresponding to one or more received function call request signals among one or more manager modules, application modules, and service modules and calling the respective selected modules to relay the modules to each other.

The relay unit may include one or more call functions corresponding to one or more function call request signals.

The request signal receiving unit may include a first request signal receiving unit receiving a first function call request signal for a first manager module among one or more manager modules to call a first application module among one or more application modules.

The request signal receiving unit may further include a second request signal receiving unit receiving a second function call request signal for a second application module among one or more application modules to call a first service module among one or more service modules.

The request signal receiving unit may further include a third request signal receiving unit receiving a third function call request signal for a second service module among one or more service modules to call a third application module among one or more application modules.

The relay unit may select a first call function corresponding to the first function call request signal among one or more call functions, call the first application module through the first call function, and relay the called first application module and the first manager module to each other when the first function call request signal is received.

The relay unit may select a second call function corresponding to the second function call request signal among one or more call functions, call the first service module through the second call function, and relay the called first service module and the second application module to each other when the second function call request signal is received.

The relay unit may select a third call function corresponding to the third function call request signal among one or more call functions, call the third application module through the third call function, and relay the called third application module and the second service module to each other when the third function call request signal is received.

Another exemplary embodiment of the present invention provides a module relay method including: (a) receiving, by a request signal receiving unit, one or more function call request signals from one or more manager modules and one or more application modules included in an application layer and one or more service modules included in basic software (BSW); and (b) selecting, by a relay unit, the modules corresponding to one or more received function call request signals among one or more manager modules, application modules, and service modules and calling the respective selected modules to relay the modules to each other.

Step (a) may include (a1) receiving, by a first request signal receiving unit, a first function call request signal for a first manager module among one or more manager modules to call a first application module among one or more application modules.

Step (a) may further include (a2) receiving, by a second request signal receiving unit, a second function call request signal for a second application module among one or more application modules to call a first service module among one or more service modules.

Step (a) may further include (a3) receiving, by a third request signal receiving unit, a third function call request signal for a second service module among one or more service modules to call a third application module among one or more application modules.

Step (b) may include (b1) selecting call functions corresponding to one or more function call request signals among one or more call functions.

Step (b) may include (b2) selecting, by the relay unit, a first call function corresponding to the first function call request signal among one or more call functions, calling the first application modules through the first call function, and relaying the called first application module and the first manager module to each other when the first function call request signal is received.

Step (b) may further include (b3) selecting, by the relay unit, a second call function corresponding to the second function call request signal among one or more call functions, calling the first service module through the second call function, and relaying the called first service module and the second application module to each other when the second function call request signal is received.

Step (b) may further include (b4) selecting, by the relay unit, a third call function corresponding to the third function call request signal among one or more call functions, calling the third application module through the third call function, and relaying the called third application module and the second service module to each other when the third function call request signal is received.

Advantageous Effects

According to exemplary embodiments of the present invention, calls among one or more manager modules, application modules, and service modules are relayed in the middle to remove execution relationships of functions of the respective modules, and as a result, function execution independency among the respective modules can be guaranteed.

Further, since the manager module can be prevented from directly executing the application module, even though the function of at least one of the manager module or the application module is changed, the present invention does not influence execution of the function of another module.

When the application module needs to a hardware associated function, call of a hardware function between the corresponding application module and the service module is relayed in the middle to guarantee hardware independency between the application module and a basic program.

The present invention includes a platform abstract layer (PAL) which is a software hierarchical structure to serve as a runtime environment (RTE) in an AUTOSAR.

BEST MODE

Hereinafter, preferred embodiments will be presented in order to help understanding the present invention. However, the exemplary embodiments are just provided to easily understand the present invention and contents of the present invention are not limited to the exemplary embodiments.

Figure 1:
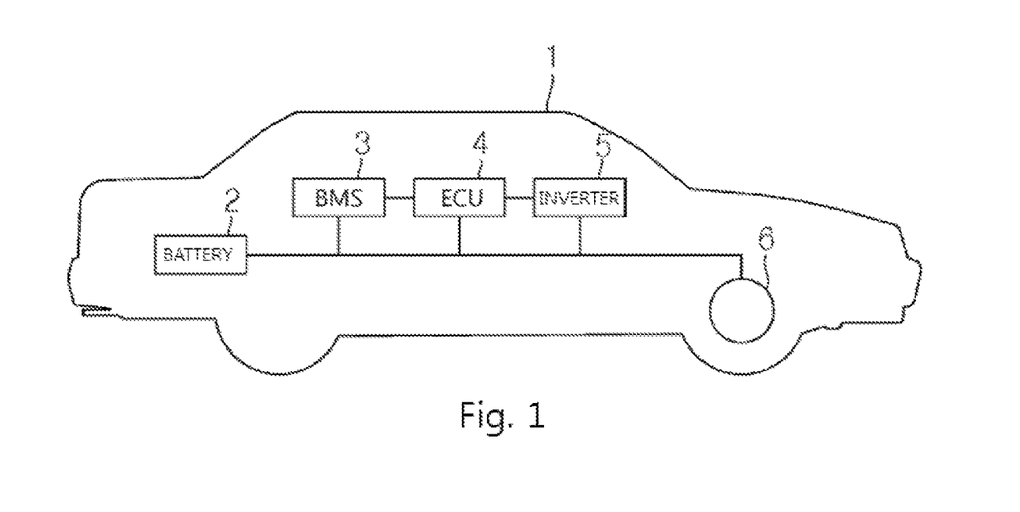
FIG. 1 is a block diagram illustrating a configuration of an electric vehicle 1.

FIG. 1 is a block diagram illustrating a configuration of an electric vehicle 1.

Referring to FIG. 1, in general, the electric vehicle 1 may be configured to include a battery 2, a battery management system (BMS) 3, an electronic control unit (ECU) 4, an inverter 5, and a motor 6.

The battery 2 is an electric energy source that drives the electric vehicle 1 by providing drive force to the motor 6. The battery 2 may be charged or discharged by the inverter 5 depending on driving of the motor 6 or an internal combustion engine (not illustrated).

Herein, the type of battery 2 is not particularly limited and may be constituted by, for example, a lithium ion battery, a lithium polymer battery, a nickel cadmium battery, a nickel hydrogen battery, a nickel zinc battery, and the like.

Further, the battery 2 is formed by a pack in which a plurality of battery cells are connected in series or in parallel. In addition, one or more packs are provided to form the battery 2.

The BMS 3 estimates a state of the battery 2 and manages the battery 2 by using the estimated state information. For example, the BMS 3 estimates and manages the state information of the battery 2, which includes a state of charging (SOC), a state of health (SOH), a maximum input/output power permission amount, an output voltage, and the like of the battery 2. In addition, the BMS 3 controls the charging or discharging of the battery 2 by using the state information and furthermore, may estimate an exchange time of the battery 2.

The ECU 4 is an electronic control device that controls a state of the electric vehicle 1. For example, the ECU 4 determines a torque degree based on information including an accelerator, a brake, a speed, and the like and controls an output of the motor 6 to be suitable for torque information.

Further, the ECU 4 transmits a control signal to the inverter 5 so as to charge or discharge the battery 2 based on the state information including the SOC, SOH, and the like of the battery 2 received by the BMS 3.

The inverter 5 allows the battery 2 to be charged or discharged based on the control signal of the ECU 4.

The motor 6 drives the electric vehicle 1 based on control information (for example, torque information) received from the ECU 4 by using electric energy of the battery 2.

Since the electric vehicle 1 is driven by using the electric energy of the battery 2, the battery 2 and the motor 6 may be connected through various circuits.

Meanwhile, in the EMS 3, since one or more application modules 12 connected with the battery 2, a manager module controlling the application modules, and service modules are connected with each other in terms of an execution relationship, internal function calling is permitted among the application modules, the manager module, and the service modules, and as a result, a functional change of a specific module may cause a functional change of the other module. Therefore, in the present invention, a module control device 100 will be described, which prevents the functional change of the specific module from influencing the functional change of the other module by relaying the modules in the middle so as to prevent the execution relationship among the application module, the manager module, and the service module from being connected to each other, through FIGS. 4 to 7 to be described below.

Figure 2:
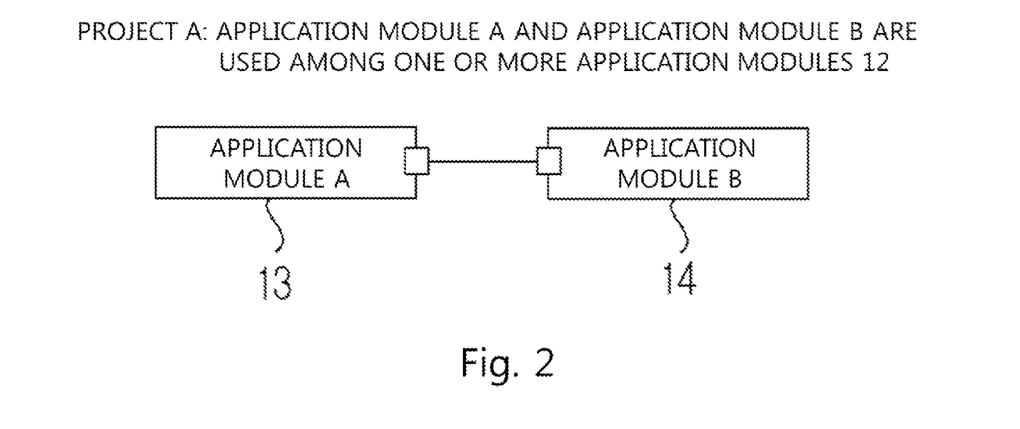
FIG. 2 is a diagram illustrating an execution relationship among one or more application modules 12 on Project A in the related art.
Figure 3:
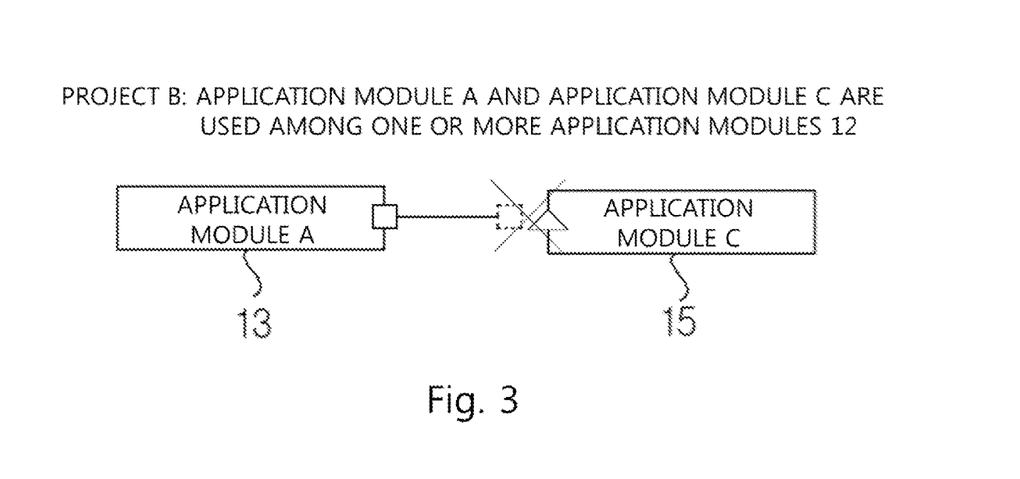
FIG. 3 is a diagram illustrating the execution relationship among one or more application modules 12 on Project B in the related art.

FIG. 2 is a diagram illustrating an execution relationship among one or more application modules 12 on Project A in the related art. FIG. 3 is a diagram illustrating the execution relationship among one or more application modules 12 on Project B in the related art.

Referring to Project A illustrated in FIG. 2, Application Module A 13 and Application Module B 14 among one or more application modules 12 in the related art are connected so that internal functions of both modules are the same as each other and further, connected to each other in terms of the execution relationship. Therefore, on Project A, a function execution between Application Module A 13 and Application Module B 14 may be normally performed.

Referring to Project B illustrated in FIG. 3, internal functions of Application Module A 13 and Application Module C 15 are different from each other and further, the execution relationships are not connected to each other. Therefore, on Project B, the functional execution between Application Module A 13 and Application Module C 15 may not be normally performed and reuse of the modules becomes invalid even in an execution relationship with the other application module 12 in addition to Application Module C 15.

Consequently, the internal functions of Application Module A 13 and Application Module B 14 are the same as each other, and as a result, the functional execution may be normally performed, but since the internal functions of Application Module A 13 and Application Module C 15 are not the same as each other, the functional execution may not be normally performed and there is inconvenience that contents of Application Module A 13 need to be changed in order to functionally connect Application Module A 13 and Application Module C 15.

Therefore, in the present invention, the module relay device 100 will be described in more detail, which may guarantee independency by removing execution relationships of one or more respective application modules 12 without changing contents of Application Module A 130 through FIGS. 4 to 7 to be described below.

Meanwhile, only one or more application modules 12 are described in FIGS. 2 and 3, but one or more manager modules and service modules 21 will be described together in addition to one or more application modules 12 in FIGS. 4 to 7.

Figure 4:
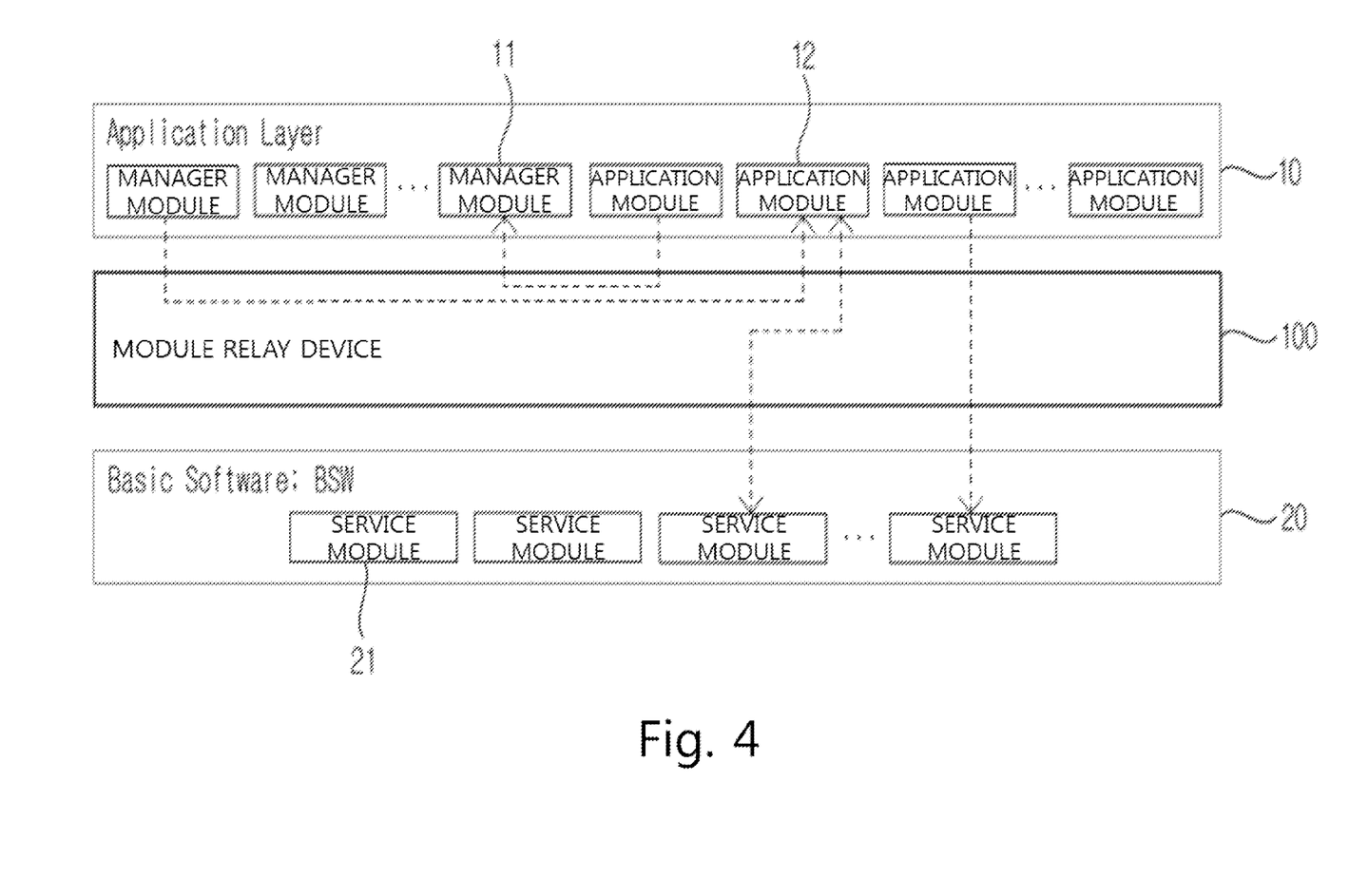
FIG. 4 is a configuration diagram illustrating a configuration of a module relay device 100 according to an exemplary embodiment of the present invention.
Figure 5:
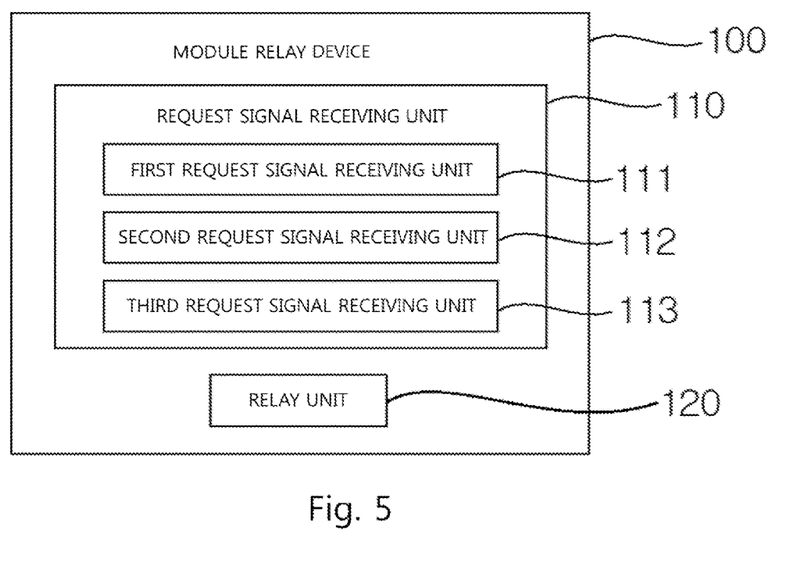
FIG. 5 is a block diagram illustrating, in more detail, the configuration of the module relay device 100 illustrated in FIG. 3.
Figure 6:
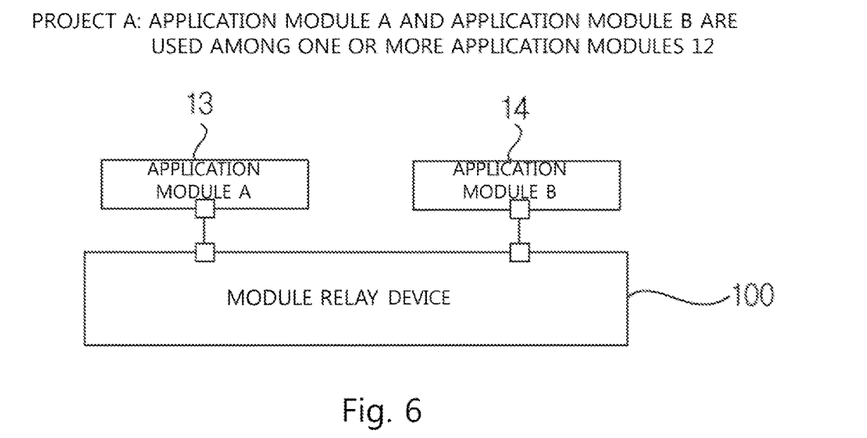
FIG. 6 is a diagram illustrating an execution relationship among one or more application modules 12 on Project A according to an exemplary embodiment of the present invention.
Figure 7:
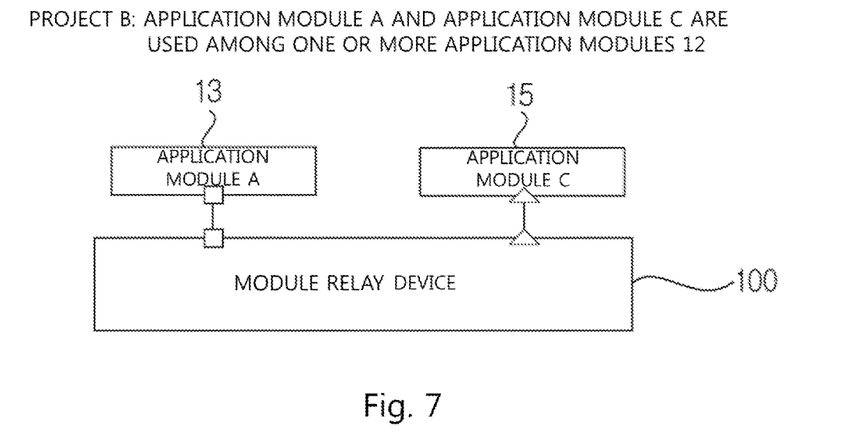
FIG. 7 is a diagram illustrating an execution relationship among one or more application modules 12 on Project B according to the exemplary embodiment of the present invention.

FIG. 4 is a configuration diagram illustrating a configuration of a module relay device 100 according to an exemplary embodiment of the present invention. FIG. 5 is a block diagram illustrating, in more detail, the configuration of the module relay device 100 illustrated in FIG. 3. FIG. 6 is a diagram illustrating an execution relationship among one or more application modules 12 on Project A according to an exemplary embodiment of the present invention. FIG. 7 is a diagram illustrating an execution relationship among one or more application modules 12 on Project B according to an exemplary embodiment of the present invention.

Referring to FIGS. 4 to 7, the module relay device 100 according to the present invention includes a request signal receiving unit 110 and a relay unit 120.

First, the request signal receiving unit 110 may serve to receive one or more function call request signals from one or more manager modules 11 included in an application layer 10 and one or more service modules 21 included in basic software (BSW) 20. Herein, one or more manager modules 11 may include an application module execution control device (activity manager) (not illustrated), an application module data control device (data manager) (not illustrated), and an application module mode control device (mode manager) (not illustrated). Further, in the present invention, one or more application modules 10 may mean modules that perform a function of the BMS 3 and include a measurement module, an estimation module, a diagnosis module, a calculation module, a communication module, a manager module, a recording module, and the like. In addition, the basic program 20 may generally mean an operating system (OS) for operating the BMS 3. Herein, a service area that performs a hardware function may be present in an area of the basic program 20 and one or more service modules 21 may be included in the corresponding service area. The service module 21 may include a system service module, a communication service module, an input/output (I/O) service module, and a memory service module.

The request signal receiving unit 110 may include first to third request signal receiving units 111, 112, and 113 that receive one or more function call request signals from one or more manager modules 11, application modules 12, and service modules 21.

The first request signal receiving unit 111 may serve to receive a first function call request signal for a specific manager module (for example, a first manager module) among one or more manager modules 11 to call a specific application module (for example, a first application module) among one or more application modules 12. Herein, the first function call request signal may mean a function called to execute a function of the application module 11 among one or more call functions included in the relay unit 120 to be described below and the call function may correspond to the respective function call request signals. That is, since one or more manager modules 11 may not directly call one or more application modules 12, when the manager module 11 calls the function of the application module 12, the first request signal receiving unit 111 receives the first function call request signal from the manager module 11 and transmits the received first function call request signal to the relay unit 120 to be described below to the call function of the application module 11.

The second request signal receiving unit 112 may serve to receive a second function call request signal for a specific application module (for example, a second application module) among one or more application modules 12 to call a specific service module (for example, a first service module) among one or more service modules 21. Herein, the second function call request signal may mean a function called to execute a function of the service module 21 among one or more call functions included in the relay unit 12 to be described below and the call function may correspond to the respective function call request signals. That is, since one or more application modules 12 may not directly call one or more service modules 21, when the application module 11 calls the function of the service module 21, the second request signal receiving unit 112 receives the second function call request signal from the application module 12 and transmits the received second function call request signal to the relay unit 120 to be described below to the call function of the service module 21.

The third request signal receiving unit 113 may serve to receive a third function call request signal for a specific service module (for example, a second service module) among one or more service modules 21 to call a specific application module (for example, a third application module) among one or more application modules 12. Herein, the third function call request signal may mean a function called to execute a function of the application module 12 among one or more call functions included in the relay unit 120 to be described below and the call function may correspond to the respective function call request signals. That is, since one or more service modules 21 may not directly call one or more application modules 12, when the service module 21 calls the function of the application module 12, the third request signal receiving unit 113 receives the third function call request signal from the service module 21 and transmits the received third function call request signal to the relay unit 120 to be described below to call the function of the application module 12.

Last, the relay unit 120 selects the modules corresponding to the received first to third function call request signals among one or more manager modules 11, one or more application modules 12, and one or more service modules 21 and calls the functions of the respective selected modules to relay the called functions to each other. Herein, the relay may mean that two respective modules are connected to each other to share the functions of the modules.

The relay unit 120 that performs the role may select the first call function corresponding to the first function call request signal among one or more call functions and relay the specific application module 12 (for example, the first application module) corresponding thereto and the first manager module through the selected first call function when the first function call request signal is received through the first request signal receiving unit 111.

Further, the relay unit 120 may select the second call function corresponding to the second function call request signal among one or more call functions and relay the specific service module 21 (for example, the first service module) corresponding thereto and the second application module through the selected second call function when the second function call request signal is received through the second request signal receiving unit 112.

The relay unit 120 may select the third call function corresponding to the third function call request signal among one or more call functions and relay the specific application module 12 (for example, the third application module) corresponding thereto and the second service module through the selected third call function, when the third function call request signal is received through the third request signal receiving unit 113.

In the exemplary embodiment, the module relay device 100 according to the present invention may include a platform abstract layer (PAL) which is a software hierarchical structure.

The platform abstract layer (PAL) may serve as an AUTOSAR runtime environment (RTE) that secures independency among operations and functions of AUTOSAR standard software modules.

As described through FIGS. 4 to 7, the module relay device 100 according to the present invention may serve to receive the first to third function call request signals from one or more manager modules 11, application modules 12, and service modules 21 through the first to third request signal receiving units 111, 112, and 113 and relay the application module 12 and the service module 21 and call the functions of the modules through the call functions corresponding to the received second and third function call request signals.

Figure 8:
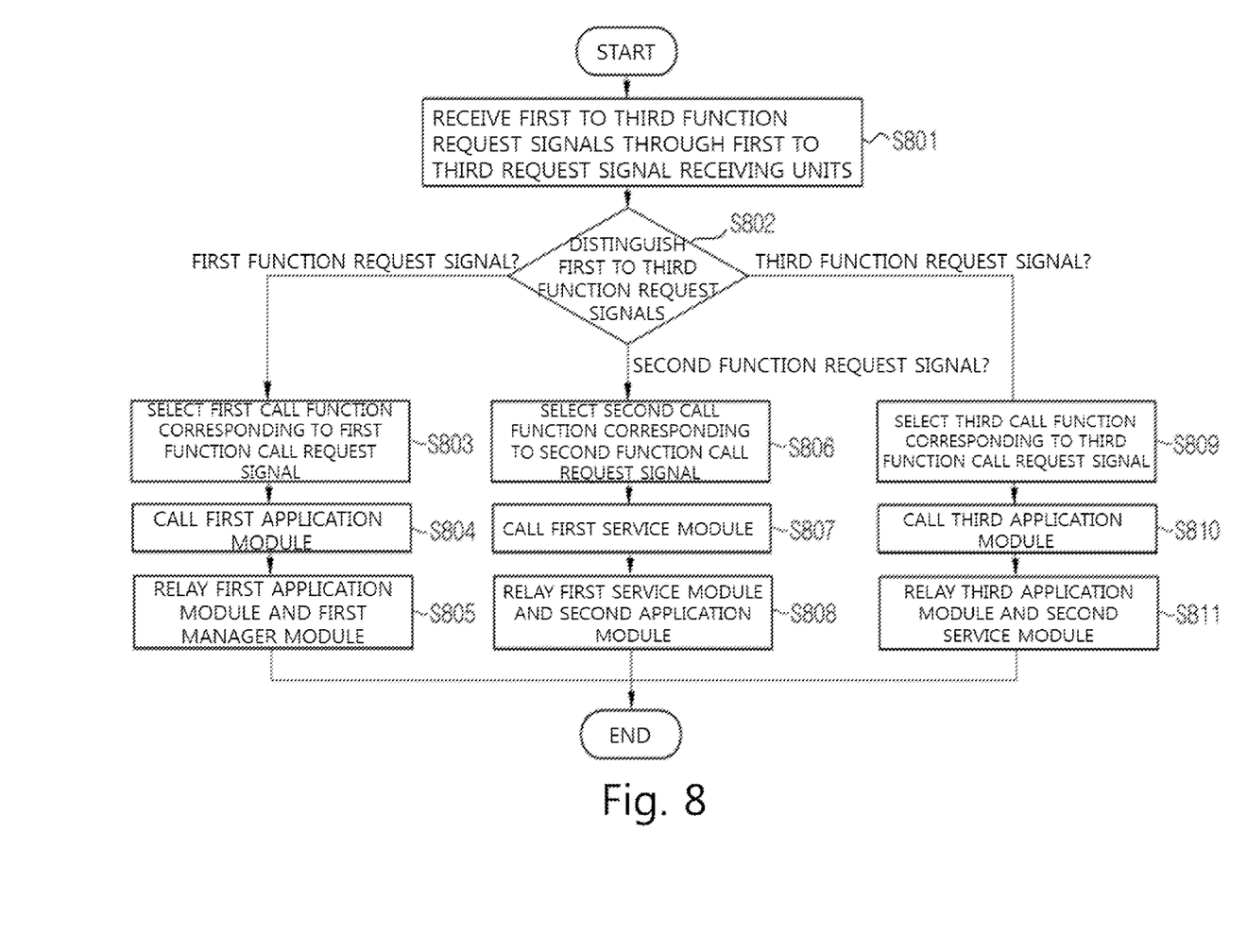
FIG. 8 is a flowchart illustrating an operating flow of a module relay device 100 according to an exemplary embodiment of the present invention.

FIG. 8 is a flowchart illustrating an operating flow of a module relay device 100 according to an exemplary embodiment of the present invention.

Referring to FIG. 6, first, the first to third function call request signals are received from one or more manager modules 11, application modules 12, and service modules 21 through the first to third request signal receiving units 111, 112, and 113 (S801).

Then, the relay unit 120 distinguishes the received first to third function request call signals (S802). For example, the relay unit 120 distinguishes whether the received function call request signal is the first function call request signal, the second function call request signal, or the third function call request signal.

When the received function call request signal corresponds to the first function call request signal, the relay unit 120 selects the first call function corresponding to the received first function call request signal among one or more call functions (S803).

In addition, the relay unit 120 calls the corresponding first application module 12 (S804) and relays and connects the first manger module 11 and the called first application module 12 to each other (S805).

When the received function call request signal corresponds to the second function call request signal, the relay unit 120 selects the second call function corresponding to the received second function call request signal among one or more call functions (S806).

In addition, the relay unit 120 calls the corresponding first service module 21 (S807) and relays and connects the second application module 12 and the called first service module 21 to each other (S808).

When the received function call request signal corresponds to the third function call request signal, the relay unit 120 selects the third call function corresponding to the received third function call request signal among one or more call functions (S809).

In addition, the relay unit 120 calls the corresponding third application module (S810) and relays and connects the second service module 21 and the called third application module 12 to each other (S811).

The present invention has been described in detail with reference to the preferred embodiments. However, it will be appreciated by those skilled in the art that various modifications and changes of the present invention can be made within the scope without departing from the spirit and the scope of the present invention which are defined in the appended claims and their equivalents.

The invention claimed is:

1. A battery management system (BMS) of a vehicle, the BMS comprising:
 a module relay device;
 one or more manager modules included in an application layer;
 one or more application modules included in the application layer; and
 one or more service modules included in basic software (BSW),
 wherein the module relay device includes:
  a request signal receiving unit receiving one or more function call request signals from the one or more manager modules and the one or more service modules; and
  a relay unit selecting the modules corresponding to one or more received function call request selecting the modules corresponding to one or more received function call request signals among one or more manager modules, application modules, and service modules and calling the respective selected modules to relay the modules to each other,
 wherein the BMS is configured to control charging and discharging of a battery,
 wherein one of the manager modules submits a function call request signal to one of the application modules, via the relay unit, to charge and or discharge the battery, and wherein the module relay device includes a platform abstract layer (PAL) that serves as an Automotive System Architecture (AUTOSAR) runtime environment (RTE).

2. The BMS of claim 1, wherein the relay unit includes one or more call functions corresponding to one or more function call request signals.

3. The BMS of claim 2, wherein the request signal receiving unit includes a first request signal receiving unit receiving a first function call request signal for a first manager module among one or more manager modules to call a first application module among one or more application modules.

4. The BMS of claim 3, wherein the relay unit selects a first call function corresponding to the first function call request signal among one or more call functions, calls the first application module through the first call function, and relays the called first application module and the first manager module to each other when the first function call request signal is received.

5. The BMS of claim 2, wherein the request signal receiving unit further includes a second request signal receiving unit receiving a second function call request signal for a second application module among one or more application modules to call a first service module among one or more service modules.

6. The BMS of claim 5, wherein the relay unit selects a second call function corresponding to the second function call request signal among one or more call functions, calls the first service module through the second call function, and relays the called first service module and the second application module to each other when the second function call request signal is received.

7. The BMS of claim 2, wherein the request signal receiving unit further includes a third request signal receiving unit receiving a third function call request signal for a second service module among one or more service modules to call a third application module among one or more application modules.

8. The BMS of claim 7, wherein the relay unit selects a third call function corresponding to the third function call request signal among one or more call functions, calls the third application module through the third call function, and relays the called third application module and the second service module to each other when the third function call request signal is received.

9. The BMS of claim 1, wherein the one or more application modules includes at least one of a measurement module, an estimation module, a diagnosis module, a calculation module, a communication module, a manager module, and a recording module.

10. The BMS of claim 1, wherein the one or more service modules includes at least one of a system service module, a communication service module, an input/output (I/O) service module, and a memory service module.

11. A module relay method, comprising:
 providing a battery management system (BMS) of a vehicle including:
  a module relay device including a request signal receiving unit and a relay unit;
  one or more manager modules included in an application layer;
  one or more application modules included in the application layer; and
  one or more service modules included in basic software (BSW), receiving by the request signal receiving unit, one or more function call request signals from the one or more manager modules and the one or more application modules and the one or more service modules;

selecting, by the relay unit, the modules corresponding to one or more received function call request signals among one or more manager modules, application modules, and service modules and calling the respective selected modules to relay the modules to each other, controlling, via the BMS, charging and discharging of a battery, and submitting, by one of the manager modules, a function call request signal to one of the application modules, via the relay unit, to charge/discharge the battery, wherein the module relay device includes a platform abstract layer (PAL) that serves as an Automotive System Architecture (AUTOSAR) runtime environment (RTE).

12. The module relay method of claim 11, wherein the receiving the one or more function call request signals includes receiving, by a first request signal receiving unit, a first function call request signal for a first manager module among one or more manager modules to call a first application module among one or more application modules.

13. The module relay method of claim 12, wherein the selecting the modules corresponding to one or more received function call request signals includes selecting, by the relay unit, a first call function corresponding to the first function call request signal among one or more call functions, calling the first application modules through the first call function, and relaying the called first application module and the first manager module to each other when the first function call request signal is received.

14. The module relay method of claim 11, wherein the receiving the one or more function call request signals includes receiving, by a second request signal receiving unit, a second function call request signal for a second application module among one or more application modules to call a first service module among one or more service modules.

15. The module relay method of claim 14, wherein the selecting the modules corresponding to one or more received function call request signals includes selecting, by the relay unit, a second call function corresponding to the second function call request signal among one or more call functions, calling the first service module through the second call function, and relaying the called first service module and the second application module to each other when the second function call request signal is received.

16. The module relay method of claim 11, wherein the receiving the one or more function call request signals includes receiving, by a third request signal receiving unit, a third function call request signal for a second service module among one or more service modules to call a third application module among one or more application modules.

17. The module relay method of claim 16, wherein the selecting the modules corresponding to one or more received function call request signals includes selecting, by the relay unit, a third call function corresponding to the third function call request signal among one or more call functions, calling the third application module through the third call function, and relaying the called third application module and the second service module to each other when the third function call request signal is received.

18. The module relay method of claim 11, wherein step the selecting the modules corresponding to one or more received function call request signals includes selecting call functions corresponding to one or more function call request signals among one or more call functions.

19. The module relay method of claim 11, wherein the one or more application modules includes at least one of a measurement module, an estimation module, a diagnosis module, a calculation module, a communication module, a manager module, and a recording module.

20. The module relay method of claim 11, wherein the one or more service modules includes at least one of a system service module, a communication service module, an input/output (I/O) service module, and a memory service module.

* * * * *